(12) United States Patent
Yen et al.

(10) Patent No.: US 11,018,534 B2
(45) Date of Patent: May 25, 2021

(54) ROTOR, MOTOR INCLUDING ROTOR, AND POWER UNIT INCLUDING MOTOR

(71) Applicant: Nidec Corporation, Kyoto (JP)

(72) Inventors: Sheng-Chan Yen, Taipei (TW); Yu-Wei Hsu, Taipei (TW); Guo-Jhih Yan, Taipei (TW); Hsin-Nan Lin, Taipei (TW); Kuo-Min Wang, Taipei (TW); Cheng-Tsung Liu, Kaohsiung (TW)

(73) Assignee: Nidec Corporation, Kyoto (JP)

(*) Notice: Subject to any disclaimer, the term of this patent is extended or adjusted under 35 U.S.C. 154(b) by 3 days.

(21) Appl. No.: 16/477,222

(22) PCT Filed: Feb. 19, 2018

(86) PCT No.: PCT/JP2018/005618
§ 371 (c)(1),
(2) Date: Jul. 11, 2019

(87) PCT Pub. No.: WO2018/159339
PCT Pub. Date: Sep. 7, 2018

(65) Prior Publication Data
US 2019/0348874 A1  Nov. 14, 2019

(30) Foreign Application Priority Data
Feb. 28, 2017  (CN) .......................... 201710112720.0

(51) Int. Cl.
*H02K 1/24* (2006.01)
*H02K 19/10* (2006.01)
*H02K 29/03* (2006.01)

(52) U.S. Cl.
CPC ........... *H02K 1/246* (2013.01); *H02K 19/103* (2013.01); *H02K 29/03* (2013.01)

(58) Field of Classification Search
CPC ............ H02K 1/22; H02K 1/24; H02K 1/246; H02K 1/276; H02K 19/103; H02K 29/03; H02K 2213/00
(Continued)

(56) References Cited

U.S. PATENT DOCUMENTS

2013/0320796 A1* 12/2013 Vyas .................... H02K 1/2766
310/156.43
2015/0372546 A1  12/2015 Büttner et al.
(Continued)

FOREIGN PATENT DOCUMENTS

JP  2002199675 A  *  7/2002
JP  2006325297 A  *  11/2006
(Continued)

OTHER PUBLICATIONS

Kondo, Machine Translation of JP2013046434, Mar. 2013 (Year: 2013).*
(Continued)

*Primary Examiner* — Quyen P Leung
*Assistant Examiner* — Eric Johnson
(74) *Attorney, Agent, or Firm* — Keating & Bennett

(57) ABSTRACT

A rotor is located around an outer periphery of a rotation shaft of a motor and rotates together with the rotation shaft. The rotor includes magnetic steel plates laminated in an axial direction and including a through-hole group passing therethrough in the axial direction. The through-hole group includes through-holes each including, as a central line, an imaginary line extending in the radial direction and having an arcuate shape extending from the central line to both sides and radially outward. The through-holes are arranged in the radial direction. Among the through-holes, a radius of curvature of an arcuate radially inner side surface of the radially innermost through-hole is the smallest, and/or a radius of
(Continued)

curvature of an arcuate radially outer side surface of the radially outermost through-hole is the largest.

12 Claims, 6 Drawing Sheets

(58) Field of Classification Search
USPC .......... 310/156.53, 156.56, 156.57, 216.074, 310/216.107
See application file for complete search history.

(56) References Cited

U.S. PATENT DOCUMENTS

| 2017/0019006 | A1* | 1/2017 | Misu | H02K 1/246 |
| 2019/0229568 | A1* | 7/2019 | Toda | H02K 19/24 |
| 2019/0238012 | A1* | 8/2019 | Dmitrievskii | H02K 21/025 |

FOREIGN PATENT DOCUMENTS

| JP | 2007-129884 A | | 5/2007 |
| JP | 2008-022672 A | | 1/2008 |
| JP | 2013046434 A | * | 3/2013 |
| JP | 2017-017957 A | | 1/2017 |

OTHER PUBLICATIONS

Kitamura, Machine Translation of JP2002199675, Jul. 2002 (Year: 2002).*
Ikuta, Machine Translation of JP2006325297, Nov. 2006 (Year: 2006).*
Ono, Machine Translation of JP2007129884, May 2007 (Year: 2007).*
Tang, Machine Translation of JP2017017957, Jan. 2017 (Year: 2017).*
Official Communication issued in International Patent Application No. PCT/JP2018/005618, dated May 15, 2018.

* cited by examiner

ROTOR, MOTOR INCLUDING ROTOR, AND POWER UNIT INCLUDING MOTOR

CROSS REFERENCE TO RELATED APPLICATIONS

This is the U.S. national stage of PCT Application No. PCT/JP2018/005618, filed on Feb. 19, 2018, and priority under 35 U.S.C. § 119(a) and 35 U.S.C. § 365(b) is claimed from Chinese Application No. 201710112720.0, filed Feb. 28, 2017; the entire contents of each application being hereby incorporated herein by reference.

1. FIELD OF THE INVENTION

The present disclosure relates to the field of motors, and, in particular, to a rotor, a motor including the rotor, and a power unit including the motor.

2. BACKGROUND

In a rotor of a synchronous reluctance motor, a magnetic steel plate constituting the rotor has a plurality of through-holes, and the through-holes form air gaps called a flux barrier. The air gaps cause a difference in magnetic reluctance. Thus, reluctance torque is generated due to the difference in magnetic reluctance when an electric current flows through the motor.

FIG. 1 is a schematic illustration of air gaps in a magnetic steel plate constituting a rotor according to an existing technology. FIG. 2 is an enlarged view of a dotted line frame P illustrated in FIG. 1 of the existing technology. In FIG. 1, the direction in which the magnetic flux easily flows in the rotor is defined as a direct axis (d axis), and the direction in which it is difficult for the magnetic flux to flow is defined as a quadrature axis (q axis). As illustrated in FIG. 1, in an existing synchronous reluctance motor 10, the air gaps 13 of the magnetic steel plate 12 constituting a rotor 11 have the same width in the radial direction of the motor. Alternatively, the widths sequentially decrease in a radially outward direction (not illustrated).

Note that as illustrated in FIGS. 1 and 2, in terms of the d-axis direction, the width of the magnetic steel plate 12 between the two radially innermost air gaps 13 sequentially decreases in a radially outward direction (that is, A<B<C). Accordingly, the magnetic reluctance in the d-axis direction of the rotor 11 becomes the largest at a position close to the stator 14. As a result, the reluctance torque is reduced because the difference between the magnetic resistance of this region and the magnetic resistance of the flux barrier is reduced.

It should be understood that the above-described introduction of an existing technology is merely intended to help description of the technology and example embodiments of the present disclosure to be clearer and more complete and help a person skilled in the art to understand the technique of the present application. The above-described technology cannot be regarded as known to a person skilled in the art because the technology is described in the background art.

SUMMARY

The inventors of example embodiments of the present disclosure have discovered that the configuration of the background art increases the torque ripple of the motor and, thus, decreases the reluctance torque of the motor. Example embodiments of the present disclosure are able to overcome the problems with the background art.

According to an example embodiment of the present disclosure, a rotor is provided. The rotor is located around the outer periphery of a rotation shaft of a motor, and the rotor rotates together with the rotation shaft. The rotor includes magnetic steel plates laminated in the axial direction. The magnetic steel plates include a through-hole group passing therethrough in the axial direction. The through-hole group includes through-holes each including, as a central line, an imaginary line extending in the radial direction and having an arcuate shape extending from the central line to both sides in a radially outward direction, and the through-holes are arranged in the radial direction. Among the through-holes, the radius of curvature of an arcuate radially inner side surface of the radially innermost through-hole is the smallest, and the radius of curvature of an arcuate radially outer side surface of the radially outermost through-hole is the largest.

According to an example embodiment of the present disclosure, among the through-holes, the radius of curvature of an arcuate surface of the through-holes other than the radially innermost through-hole and the radially outermost through-hole, the radius of curvature of an arcuate radially outer side surface of the radially innermost through-hole, and the radius of curvature of an arcuate radially inner side surface of the radially outermost through-hole are the same.

According to an example embodiment of the present disclosure, widths in the radial direction of the magnetic steel plates between two adjacent ones of the through-holes are the same or substantially the same.

According to an example embodiment of the present disclosure, widths in the radial direction of the through-holes have the following relationship: a width in the radial direction of the radially innermost through-hole>a width in the radial direction of the radially outermost through-hole>a width in the radial direction of the through-hole other than the radially innermost through-hole and the radially outermost through-hole.

According to an example embodiment of the present disclosure, as viewed in the axial direction, the magnetic steel plates include a plurality of the through-hole groups that face each other with the rotation shaft therebetween and that are arranged in a circumferential direction.

According to an example embodiment of the present disclosure, two top end portions of the two radially innermost through-holes adjacent to each other in the circumferential direction extend in the radially outward direction such that the distance therebetween increases.

According to an example embodiment of the present disclosure, the magnetic steel plates include four of the through-hole groups.

According to an example embodiment of the present disclosure, the magnetic steel plates include a slit that is located between the plurality of through-holes and that passes therethrough in the axial direction, and a width in the radial direction of the slit is smaller than a width in the radial direction of each of the plurality of through-holes.

According to an example embodiment of the present disclosure, the slit is provided in a plurality, and all of the slits have the same width in the radial direction.

According to an example embodiment of the present disclosure, the magnetic steel plates include a slit on the radially outer side of the radially outermost through-hole, and the width in the radial direction of the slit is smaller than the width in the radial direction of each of the through-holes.

According to an example embodiment of the present disclosure, there is provided a motor including a rotation shaft extending along the central axis, the rotor according to any one of the above-described example embodiments, where the rotor rotates about the rotation shaft, and a stator that faces the rotor in the radial direction.

According to an example embodiment of the present disclosure, the stator includes a plurality of teeth portions each extending in a radially inward direction, and a plurality of slots each located between the adjacent teeth portions in the circumferential direction face the top end portions of the through-holes of the through-hole group in the radial direction.

According to an example embodiment of the present disclosure, there is provided a power assembly including the motor described above.

Particular example embodiments are disclosed in detail below with reference to the description and the accompanying drawings, and the configurations, structures and examples to which the principles of the present disclosure are applicable are clarified. It is to be understood that the scopes of the example embodiments of the present disclosure are not limited by the example embodiments. The example embodiments of the present disclosure include a plurality of modifications, corrections, and equivalents without departing from the spirit and scope of the appended claims.

The above and other elements, features, steps, characteristics and advantages of the present disclosure will become more apparent from the following detailed description of the example embodiments with reference to the attached drawings.

BRIEF DESCRIPTION OF THE DRAWINGS

The accompanying drawings are provided for better understanding of the example embodiments of the present disclosure. The drawings constitute part of the specification, illustrate examples of the example embodiments of the present disclosure, and describe the principles of the present disclosure together with the text description. The following figures illustrate merely some examples of the present disclosure, and a person skilled in the art can obtain other figures on the basis of these figures under the assumption that creative work is not required.

DETAILED DESCRIPTION

The above and other features of the present disclosure are clarified below through the description with reference to the accompanying drawings. The specification and drawings describe particular example embodiments of the present disclosure in detail and some of example embodiments to which the principal of the present disclosure is applicable. It should be noted that the present disclosure is not limited to the described example embodiments and includes all the modifications, changes, and equivalents without departing from the spirit and scope of the appended claims.

Preferred example embodiments of the present disclosure are described below with reference to the accompanying drawings. In the following description of the example embodiments of the present disclosure, for ease of description, the direction parallel to the direction extending along a shaft is referred to as an "axial direction", and the direction of the radius of the shaft is referred to as a "radial direction". In addition, the direction of the circumference of a circle at the center of which there is the shaft is referred to as a "circumferential direction". However, the directions are defined merely for the convenience of description and do not limit the directions during use and manufacture of the motor.

First Example Embodiment

Figure 1:
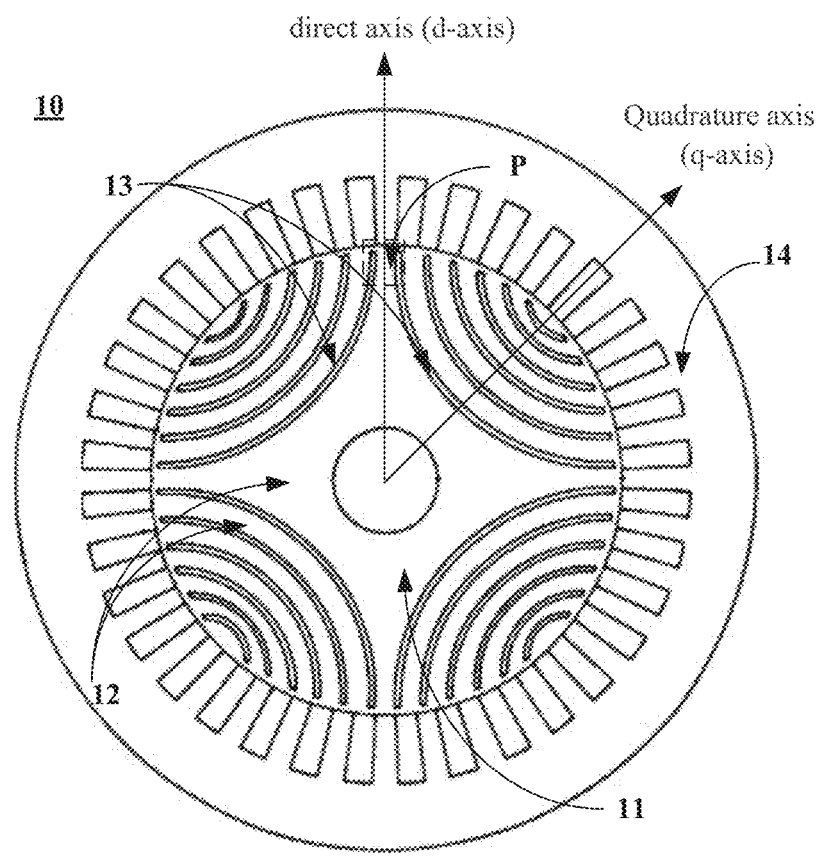
FIG. 1 is a schematic illustration of an air gap in a magnetic steel plate of a rotor according to an existing technology.
Figure 2:
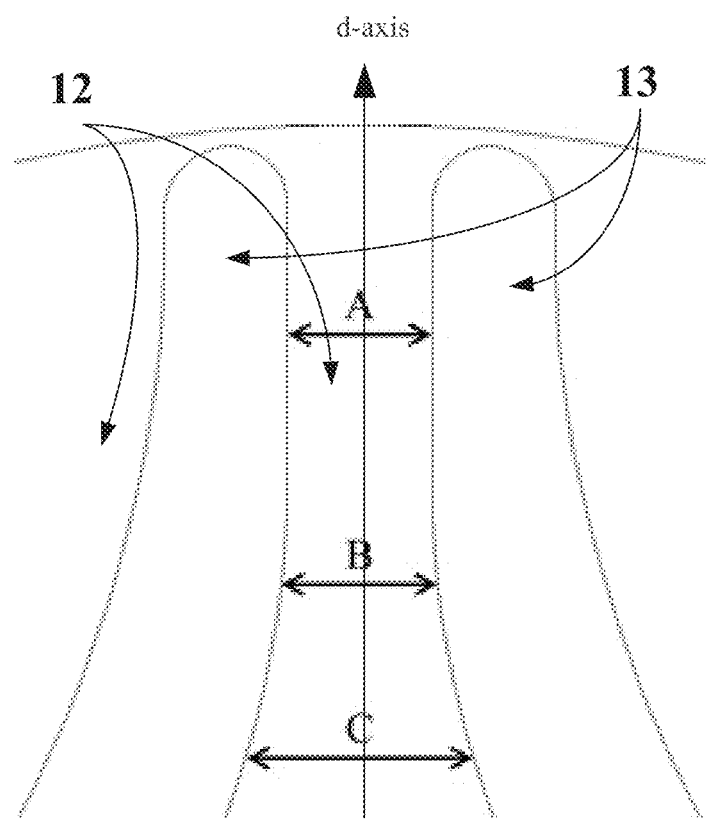
FIG. 2 is an enlarged view of a dotted line frame P illustrated in FIG. 1.
Figure 3:
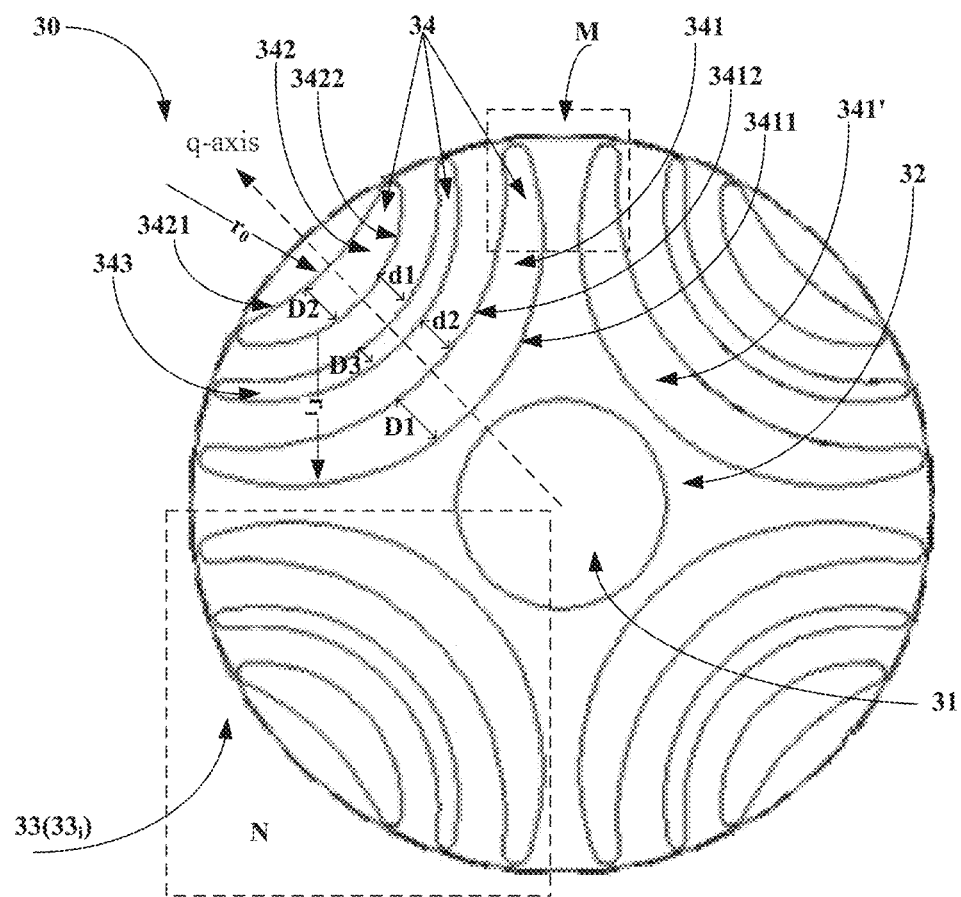
FIG. 3 is a plan view of a rotor according to a first example embodiment of the present disclosure.

The example embodiment of the present disclosure provides a rotor. FIG. 3 is a plan view of the rotor according to the first example embodiment of the present disclosure. The rotor is made from magnetic steel plates laminated in the axial direction. FIG. 3 is a view of one of the magnetic steel plates as viewed in the axial direction.

As illustrated in FIG. 3, the rotor 30 is positioned on the outer periphery of a rotation shaft 31 of a motor (not illustrated) and rotates together with the rotation shaft 31. The rotor 30 is made from magnetic steel plates 32 laminated in the axial direction. Each of the magnetic steel plates 32 has through-hole groups 33 passing through the magnetic steel plate 32 in the axial direction. Each of the through-hole groups 33 has a plurality of through-holes 34. Each of the plurality of through-holes 34 has an arcuate shape the center line of which is an imaginary line extending in the radial direction (e.g., the q axis illustrated in FIG. 3). The through-hole 34 extends from the center line to both sides of the q axis while extending in the radially outward direction. The plurality of through-holes 34 are arranged in the radial direction.

According to the present example embodiment, among the plurality of through-holes 34, the radius of curvature $r_1$ of an arcuate radially inner side surface 3411 of a radially innermost through-hole 341 is the smallest. In addition, among the plurality of through-holes 34, the radius of curvature $r_0$ of an arcuate radially outer side surface 3421 of a radially outermost through-hole 342 is the largest. That is, among all the arcuate surfaces of the plurality of through-holes arranged in the radial direction, the radius of curvature $r_1$ of the arcuate radially inner side surface 3411 of the radially innermost through-hole 341 is the smallest, and the radius of curvature $r_0$ of the arcuate radially outer side surface 3421 of the radially outermost through-hole 342 is the largest.

Due to such a structure, the widths of the radially innermost and outermost through-holes can be increased and, thus, the difference in magnetic reluctance between the magnetic steel plates constituting the rotor can be increased. As a result, the reluctance torque can be increased.

Note that the widths of the radially innermost and radially outer through-holes are increased at the same time. However, the present example embodiment is not limited thereto. Only the width of the radially innermost through-hole may be increased, or only the width of the radially outermost through-hole may be increased. That is, only the radius of curvature $r_1$ of the arcuate radially inner side surface 3411 of the radially innermost through-hole 341 may be set to the smallest value, or only the radius of curvature $r_0$ of the arcuate radially outer side surface 3421 of the radially outermost through-hole 342 may be set to the largest value. In this manner, the reluctance torque can be similarly increased.

According to the present example embodiment, as illustrated in FIG. 3, among the plurality of through-holes 34, the radius of curvature of an arcuate surface of a through-hole 343 located between the radially innermost through-hole 341 and the radially outermost through-hole 342, the radius of curvature of the arcuate radially outer side surface 3412 of the radially innermost through-hole 341, and the radius of curvature of the arcuate radially inner side surface 3422 of the radially outermost through-hole 342 are the same. That is, the radii of curvature of all of the arcuate surfaces of the plurality of through-holes arranged in the radial direction are the same except for the radius of curvature $r_1$ of the arcuate radially inner side surface 3411 of the radially innermost through-hole 341 and the radius of curvature $r_0$ of the arcuate radially outer side surface 3421 of the radially outermost through-hole 342. Due to such a structure, the difference in magnetic reluctance can be increased more and, thus, the reluctance torque can be increased.

According to the present example embodiment, as illustrated in FIG. 3, the through-hole 341 and the through-hole 343 are two adjacent through-holes. In addition, the through-hole 343 and the through-hole 342 are two adjacent through-holes. Let d1 be the width in the radial direction of the magnetic steel plate between the adjacent through-hole 342 and through-hole 343. Let d2 be the width in the radial direction of the magnetic steel plate between the adjacent through-hole 341 and through-hole 343. Then, d1=d2. That is, the magnetic steel plates located between every two adjacent through-holes have the same width in the radial direction.

Due to such a structure, the difference between magnetic fluxes passing through the magnetic steel plate is reduced and, thus, the torque ripple can be reduced more. As a result, the reluctance torque can be increased more.

According to the present example embodiment, the widths in the radial direction of the plurality of through-holes may further have the following conditional relationship: Width D1 in the radial direction of the radially innermost through-hole 341>Width D2 in the radial direction of the radially outermost through-hole 342>Width D3 in the radial direction of the through-hole located between the radially innermost through-hole 341 and the radially outermost through-hole 342.

According to the present example embodiment, as illustrated in FIG. 3, the number of the through-holes 343 located between the radially innermost through-hole 341 and the radially outer through-hole 342 in the radial direction is one. Consequently, the following conditional relationship is satisfied: Width D1 in the radial direction of the through-hole 341>Width D2 in the radial direction of the through-hole 342>Width D3 in the radial direction of the through-hole 343.

According to such a structure, the torque ripple can be reduced even when the rotor has a small diameter and, thus, it is difficult to have an increased number of through-holes.

According to the present example embodiment, as illustrated in FIG. 3, as viewed in the axial direction, the magnetic steel plate 32 has a plurality of through-hole groups 33 (as indicated by a dotted line frame N in FIG. 3, for convenience of description, the dotted line frame N in FIG. 3 indicates only one through-hole group, and each of the other through-hole groups is similar to the portion surrounded by the dotted line frame N). The plurality of through-hole groups 33 face each other in the radial direction with the rotation shaft 31 therebetween and are arranged in the circumferential direction.

According to an example of the present example embodiment, as illustrated in FIG. 3, the magnetic steel plate 32 may have four through-hole groups 33$i$ (i=1 to 4). However, according to the present example embodiment, the number of the through-hole groups is not limited thereto, and the number of through-holes may be another number. In general, the number of through-holes is determined depending on the number of poles of the reluctance motor.

In addition, according to the present example embodiment, as illustrated in FIG. 3, each of the through-hole groups has three through-holes. However, according to the present example embodiment, the number of through-holes is not limited thereto, and the number of through-holes in each of the through-hole groups may be another number.

Figure 4:
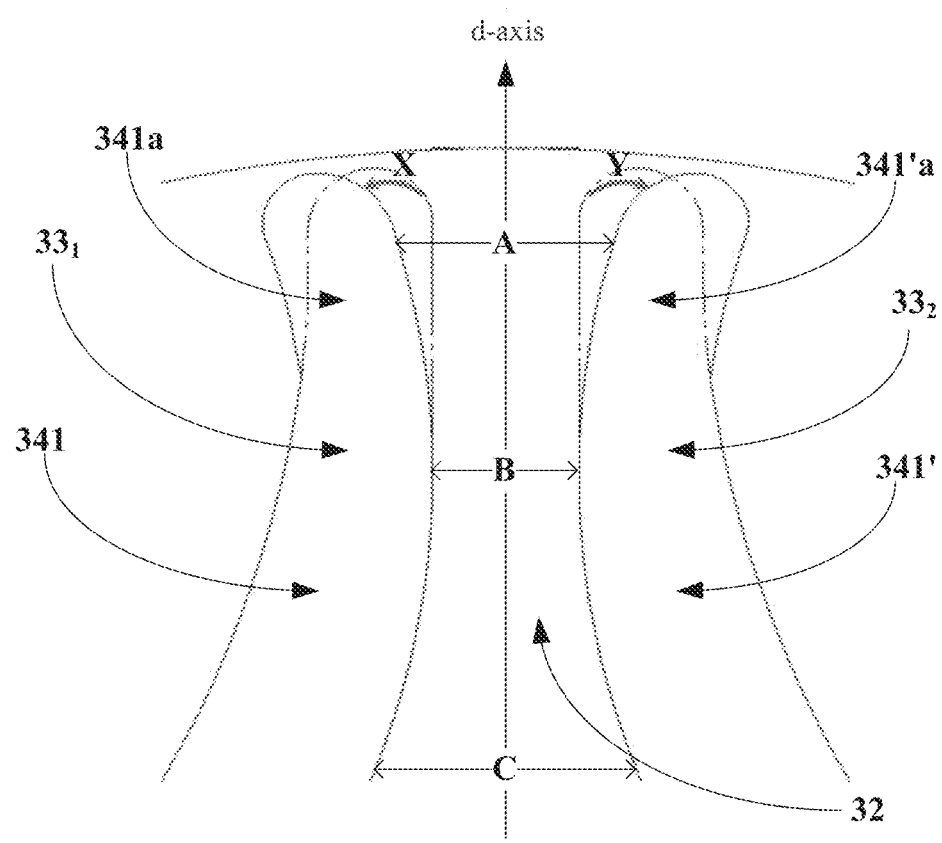
FIG. 4 is an enlarged view of a dotted line frame M illustrated in FIG. 3.

According to the present example embodiment, to further increase the reluctance torque, the magnetic flux in the d-axis direction may be increased. FIG. 4 is an enlarged view of a dotted line frame M illustrated in FIG. 3 according to the first example embodiment of the present disclosure.

FIG. 4 illustrates two radially innermost through-holes 341 and 341' of two through-hole groups 33$_1$ and 33$_2$, respectively, which are adjacent to each other in the circumferential direction. The top end portions of the two through-holes 341 and 341' extend such that the distance therebetween in the circumferential direction gradually increases. That is, as the top end portions of the two radially innermost through-holes located adjacent to each other in the circumferential direction extend in the radially outward direction, the distance therebetween in the circumferential direction increases. As illustrated in FIG. 4, the top end portions 341$a$ and 341'$a$ of the two through-holes 341 and 341' are inclined at a predetermined angle in the directions indicated by arrows X and Y, respectively. Let C, B, and A be the widths between the two through-holes 341 and 341' at positions arranged from the radially inner side to outer side in the d-axis direction. Then, the relationship B<A<C can be achieved due to the above-described structure. That is, according to the present example embodiment, the width A between the two top end portions 341$a$ and 341'$a$ of the two through-holes 341 and 341' is positioned on the radially outer side of the position of the smallest width B between the two through-holes 341 and 341'. Such a structure increases the magnetic flux in the d-axis direction. Accordingly, the difference in magnetic reluctance between the region (the region of the dotted frame M illustrated in FIG. 3) and the through-hole is increased. As a result, the reluctance torque is increased more.

Figure 5:
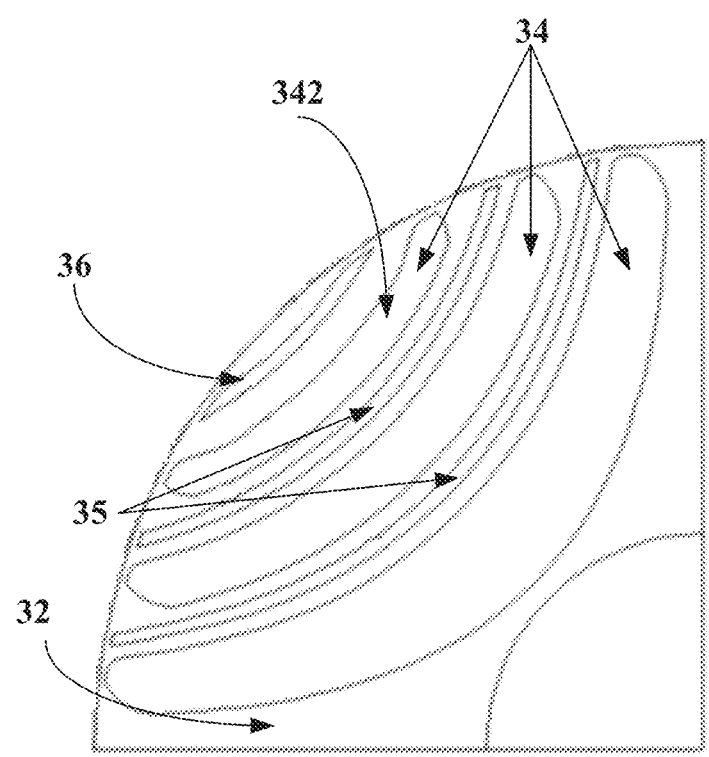
FIG. 5 is a plan view of a portion of the rotor according to the first example embodiment of the present disclosure.

According to the present example embodiment, to further reduce the torque ripple, the number of through-holes in each of the through-hole groups may be increased. FIG. 5 is a plan view of a portion of the rotor according to the first example embodiment of the present disclosure. Among the through-hole groups, FIG. 5 illustrates the situation of only one of the through-hole groups of the magnetic steel plate constituting the rotor, and the example embodiment of each of the other through-hole groups may be similar to that of the through-hole group illustrated in FIG. 5.

As illustrated in FIG. 5, the magnetic steel plate 32 may further have a slit 35 positioned between the plurality of through-holes 34, and the width in the radial direction of the slit 35 is smaller than the width in the radial direction of each of the plurality of through-holes 34. The slit 35 is a through-hole which passes through the magnetic steel plate 32 in the axial direction.

According to the present example embodiment, as illustrated in FIG. 5, in addition to having the slits 35 between the through-holes 34, the magnetic steel plate 32 may have a slit 36 on the radially outer side of the radially outermost through-hole 342. The slit 36 is a through-hole which passes through the magnetic steel plate 32 in the axial direction.

Due to such a structure, increasing the number of slits in each of the through-hole groups is equivalent to increasing the number of through-holes in each of the through-hole groups. As a result, the torque ripple can be reduced more.

According to an example of the present example embodiment, as illustrated in FIG. 5, the number of slits 35 and 36 is three. However, according to the present example embodiment, the number of slits is not limited thereto, and the number of slits 35 and 36 may be another number.

According to the present example embodiment, the slits 35 have the same width in the radial direction. However, the slits 35 and the slit 36 may have the same width in the radial direction. In this manner, by reducing the difference in magnetic flux passing through the magnetic steel plate, it is possible to reduce the torque ripple more and increase the reluctance torque.

According to the structure of the rotor of the present disclosure, the difference in magnetic reluctance between the magnetic steel plates constituting the rotor can be increased and, thus, the reluctance torque can be increased. As a result, the torque ripple can be reduced.

Second Example Embodiment

Figure 6:
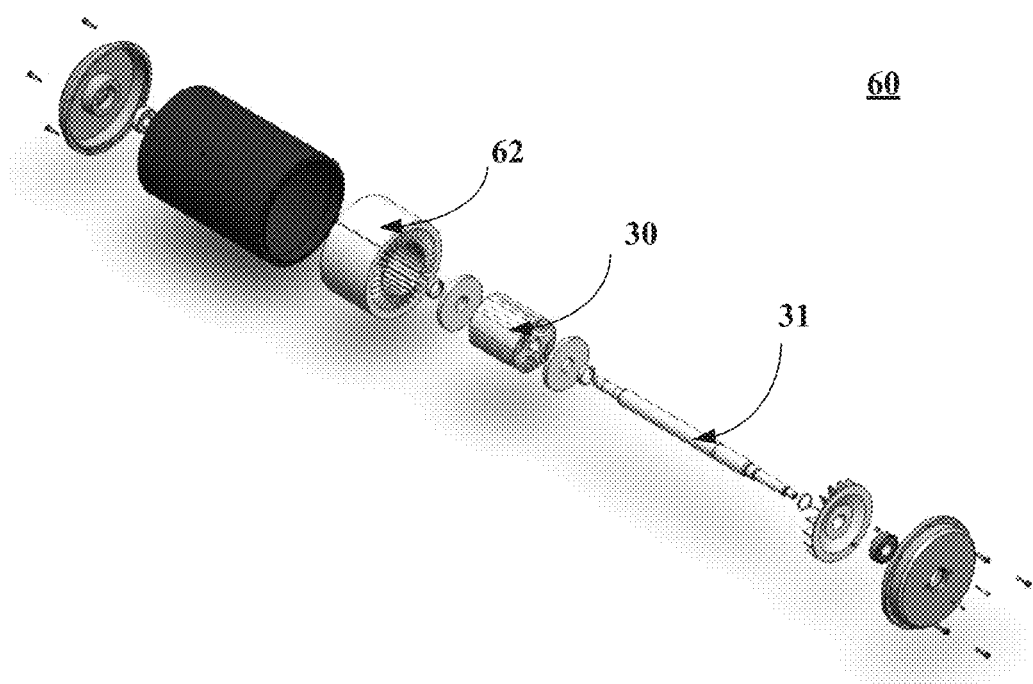
FIG. 6 is an exploded schematic view of a motor according to a second example embodiment of the present disclosure.

An example embodiment of the present disclosure further provides a motor, and FIG. 6 is an exploded schematic view of the motor according to a second example embodiment of the present disclosure.

As illustrated in FIG. 6, a motor 60 may include a rotation shaft 31 extending along the central axis, a rotor 30 that rotates with the rotation shaft 31 based on the above-described first example embodiment, a stator 62 that faces the rotor 30 in the radial direction.

According to the present example embodiment, in order to further reduce the torque ripple, there is a certain correspondence between slots of the stator of the motor and the through-holes of the magnetic steel plates constituting the rotor.

Figure 7:
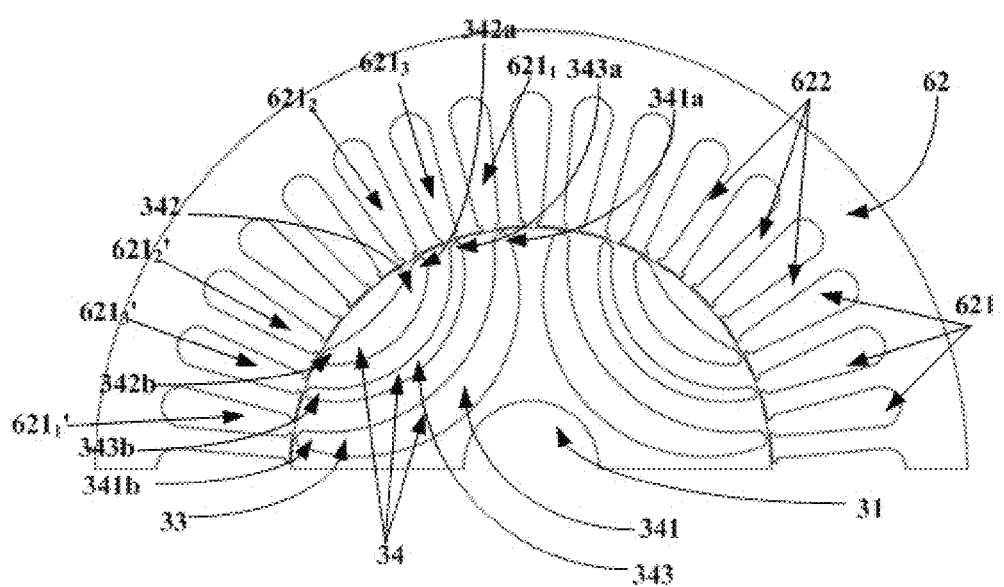
FIG. 7 is a plan view of a portion of a stator of the motor according to the second example embodiment of the present disclosure.

FIG. 7 is a plan view of a portion of a motor according to a second example embodiment of the present disclosure (FIG. 7 is a transverse sectional view of the motor taken in the axial direction of the motor).

According to the present example embodiment, as illustrated in FIG. 6 and FIG. 7, the stator 62 has a plurality of teeth portions 622 each extending in a radially inward direction. A plurality of slots 621 each located between the adjacent teeth portions 622 in the circumferential direction face the top end portions of the respective through-holes 34 of the through-hole group 33. More specifically, as illustrated in FIG. 6, two top end portions 341a and 341b of the radially innermost through-hole 341 face slots $621_1$ and $621_{1'}$ in the radial direction, respectively. Two top end portions 342a and 342b of the radially outermost through-hole 342 face slots $621_2$ and $621_{2'}$ in the radial direction, respectively. In addition, two top end portions 343a and 343b of the through-hole 343 face slots $621_3$ and $621_{3'}$ in the radial direction, respectively. In this manner, the torque ripple can be reduced more.

According to the present example embodiment, the other constituent members of the motor 60 are the same as those of an existing technology, and description of the constituent members is not repeated.

According to the structure of the rotor of the motor of the present disclosure, the difference in magnetic reluctance between the magnetic steel plates constituting the rotor can be increased and, thus, the reluctance torque is increased, and the torque ripple is reduced.

Third Example Embodiment

An example embodiment of the present disclosure provides a power assembly, and the power assembly includes the motor described in the second example embodiment. Since the main structure of the motor according to the second example embodiment has already been described in detail and the description is also applied to the third example embodiment, description of the motor is not repeated.

According to the present example embodiment, as described above, the power assembly may be any apparatus equipped with the motor, and the motor may be applied to the power transmission of a bulldozer or a power shovel which uses the motor as a power assembly.

In the power assembly according to the present disclosure, the reluctance torque of the motor is increased, and the torque ripple is reduced. As a result, a large torque can be easily output. In addition, vibration can be reduced.

While the disclosure has been described with reference to the specific examples, it will be appreciated by a person skilled in the art that these descriptions are illustrative and not a limitation on the claimed scope of the disclosure. A person skilled in the art may make various modifications and corrections to the present disclosure without departing from the spirit and principle of the present disclosure. These modifications and corrections are also within the scope of the present disclosure.

Features of the above-described preferred example embodiments and the modifications thereof may be combined appropriately as long as no conflict arises.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

The invention claimed is:

1. A rotor located around an outer periphery of a rotation shaft of a motor, the rotor rotating together with the rotation shaft, the rotor comprising:
   magnetic steel plates laminated in an axial direction; wherein
   the magnetic steel plates include a through-hole group passing therethrough in the axial direction;
   the through-hole group includes a plurality of through-holes each having, as a central line, an imaginary line extending in a radial direction and having an arcuate shape extending from the central line to both sides in a radially outward direction, and the through-holes are arranged in the radial direction;
   among the plurality of through-holes, a radius of curvature of an arcuate radially inner side surface of a radially innermost through-hole is smallest, and a radius of curvature of an arcuate radially outer side surface of a radially outermost through-hole is largest; and a radius of curvature of an arcuate surface of ones of the through-holes located between the radially innermost through-hole and the radially outermost through-hole, a radius of curvature of an arcuate radially outer side surface of the radially innermost through-hole, and a radius of curvature of an arcuate radially inner side surface of the radially outermost through-hole are the same.

2. The rotor according to claim 1, wherein widths in the radial direction between two adjacent ones of the through-holes in the through-hole group are the same.

3. The rotor according to claim 1, wherein widths in the radial direction of the through-holes have the following relationship:

a width in the radial direction of the radially innermost through-hole>a width in the radial direction of the radially outermost through-hole>a width in the radial direction of the through-hole located between the radially innermost through-hole and the radially outermost through-hole.

4. The rotor according to claim 3, wherein the magnetic steel plates include a slit that is located between the plurality of through-holes and that passes therethrough in the axial direction; and a width of the slit in the radial direction is smaller than a width in the radial direction of each of the plurality of through-holes.

5. The rotor according to claim 4, wherein a plurality of the slits are provided, and all of the plurality of slits have a same or substantially a same width in the radial direction.

6. The rotor according to claim 3, wherein the magnetic steel plates include a slit on the radially outer side of the radially outermost through-hole; and a width in the radial direction of the slit is smaller than a width in the radial direction of each of the plurality of through-holes.

7. The rotor according to claim 1, wherein the magnetic steel plates include a plurality of through-hole groups; and the plurality of through-hole groups face each other in the radial direction with the rotation shaft therebetween and are arranged in a circumferential direction.

8. The rotor according to claim 7, wherein top end portions of two radially innermost through-holes of two of the through-hole groups adjacent to each other in the circumferential direction extend in a radially outward direction such that a distance between the two radially innermost through-holes of two of the through-hole groups adjacent to each other increases in the circumferential direction.

9. The rotor according to claim 7, wherein the magnetic steel plates include four of the through-hole groups.

10. A motor comprising:

a rotation shaft extending along a central axis;

the rotor located around an outer periphery of the rotation shaft according to claim 1, the rotor rotating about the rotation shaft; and a stator that faces the rotor in the radial direction.

11. The motor according to claim 10, wherein the stator includes a plurality of teeth portions each extending in a radially inward direction; and a plurality of slots each located between the adjacent teeth portions in the circumferential direction face the top end portions of the through-holes of the through-hole group in the radial direction.

12. A power assembly comprising:

the motor according to claim 10.

* * * * *